(12) United States Patent
Yoshida et al.

(10) Patent No.: US 6,627,727 B1
(45) Date of Patent: Sep. 30, 2003

(54) METHOD OF PRECIPITATING POLYPHENYLENE ETHER

(75) Inventors: Kiyoshi Yoshida, Yokkaichi (JP); Naoto Ohsaki, Yokkaichi (JP); Hiroya Fujii, Yokkaichi (JP)

(73) Assignee: Mitsubishi Gas Chemical Co, Tokyo (JP)

( * ) Notice: Subject to any disclaimer, the term of this patent is extended or adjusted under 35 U.S.C. 154(b) by 0 days.

(21) Appl. No.: 10/019,072

(22) PCT Filed: Apr. 28, 2000

(86) PCT No.: PCT/JP00/02834

§ 371 (c)(1),
(2), (4) Date: Dec. 26, 2001

(87) PCT Pub. No.: WO01/83586

PCT Pub. Date: Nov. 8, 2001

(51) Int. Cl.$^7$ ............................ C08G 65/46; C08J 3/14
(52) U.S. Cl. ..................... 528/491; 528/495; 528/496; 528/498; 528/502 R; 528/502 A
(58) Field of Search .................. 528/491, 495, 528/496, 498, 502 R, 502 A

(56) References Cited

U.S. PATENT DOCUMENTS

| 4,088,634 A | 5/1978 | Cooper et al. |
| 4,246,398 A | 1/1981 | Sugio et al. |
| 4,503,214 A | 3/1985 | White et al. |

FOREIGN PATENT DOCUMENTS

| GB | 1051399 | 12/1966 |
| JP | A-51-34952 | 3/1976 |
| JP | B-60-23696 | 6/1985 |
| JP | A-2-36228 | 7/1988 |
| JP | A-5-78472 | 3/1993 |

*Primary Examiner*—Duc Truong
(74) *Attorney, Agent, or Firm*—Sherman & Shalloway

(57) ABSTRACT

Polyphenylene ether particles which contain fine powder in a small amount and are easy to handle at the time of molding, are obtained.

A method for precipitating polyphenylene ether, which comprises adding a non-solvent for polyphenylene ether to a solution of polyphenylene ether in a good solvent for polyphenylene ether to precipitate polyphenylene ether continuously in a stirring vessel with a reciprocating stirrer, wherein the polyphenylene ether solution is dropped outside the working range of a stirring blade.

13 Claims, 5 Drawing Sheets

Working Range

F I G. 1
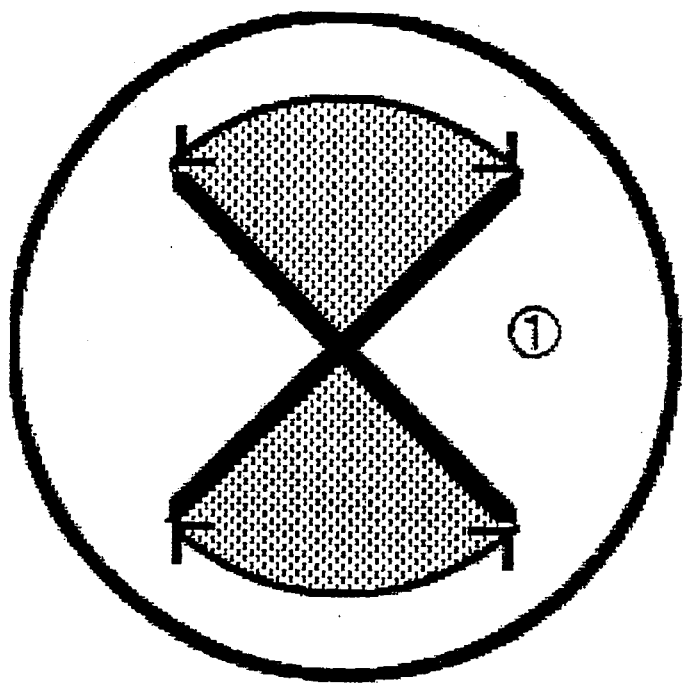
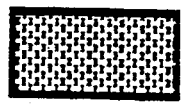 Working Range

① : Stirring Blade (Delta Blade)
② : Length of Stirring Blade
③ : Width of Stirring Blade Working Range ① : Supplying Position of the Polyphenylene Ether Solution
② : Overflowing Position Working Range
(Stirring Blade of the Upper Stage)

① : Supplying Position of the Polyphenylene Ether Solution
② : Overflowing Position Working Range ① : Supplying Position of the Polyphenylene Ether Solution
② : Overflowing Position

METHOD OF PRECIPITATING POLYPHENYLENE ETHER

TECHNICAL FIELD

The present invention relates to a method for precipitating polyphenylene ether. More specifically, the present invention relates to a method of producing polyphenylene ether which contains fine powder in a small amount and is easy to handle at the time of molding by precipitation.

PRIOR ART

As a process of producing polyphenylene ether resin, there is a process of subjecting phenol to oxidative polymerization in the presence of a copper compound and amines in a good solvent for polyphenylene ether. As a method for precipitating polyphenylene ether from a polyphenylene ether solution obtained by the above process, there is known a method in which a non-solvent for polyphenylene ether such as methanol and the like is added to the solution to precipitate particles of polyphenylene ether. The obtained particles of polyphenylene ether, however, contain fine powder in a high proportion, and consequently, there arise problems such as scattering of the powder at a post-step and defective bite from a hopper to an extruder during molding.

As a means for solving the above-mentioned problems, there is proposed a method in which a mixture of water and alcohol as the non-solvent is used (JP-B 60-23696). However, this method could not necessarily give satisfactory effect.

The present invention has been made in order to solve the above problems, and the object of the present invention is to obtain particles of polyphenylene ether which contains fine powder in a small amount and is easy to handle at the time of molding and the like.

The present inventors have made extensive studies to solve the above problems, and as a result, have found that the problems can be solved by dropping a polyphenylene ether solution at a portion which hardly undergoes shearing action by a stirring blade in a stirring vessel which has been fully stirred. Thus, the present invention has been accomplished.

That is, the present invention is to provide a method for precipitating polyphenylene ether, which comprises adding a non-solvent for polyphenylene ether to a solution of polyphenylene ether in a good solvent for polyphenylene ether to precipitate polyphenylene ether continuously in a stirring vessel equipped with a reciprocating stirrer, wherein the polyphenylene ether solution is dropped outside the working range of a stirring blade.

BRIEF EXPLANATION OF THE DRAWINGS

FIG. 1 is a schematic view of a stirring vessel with a stirring blade whose working range is 90 degrees, viewed from above.

EMBODIMENT FOR PRACTICING THE INVENTION

Figure 2:
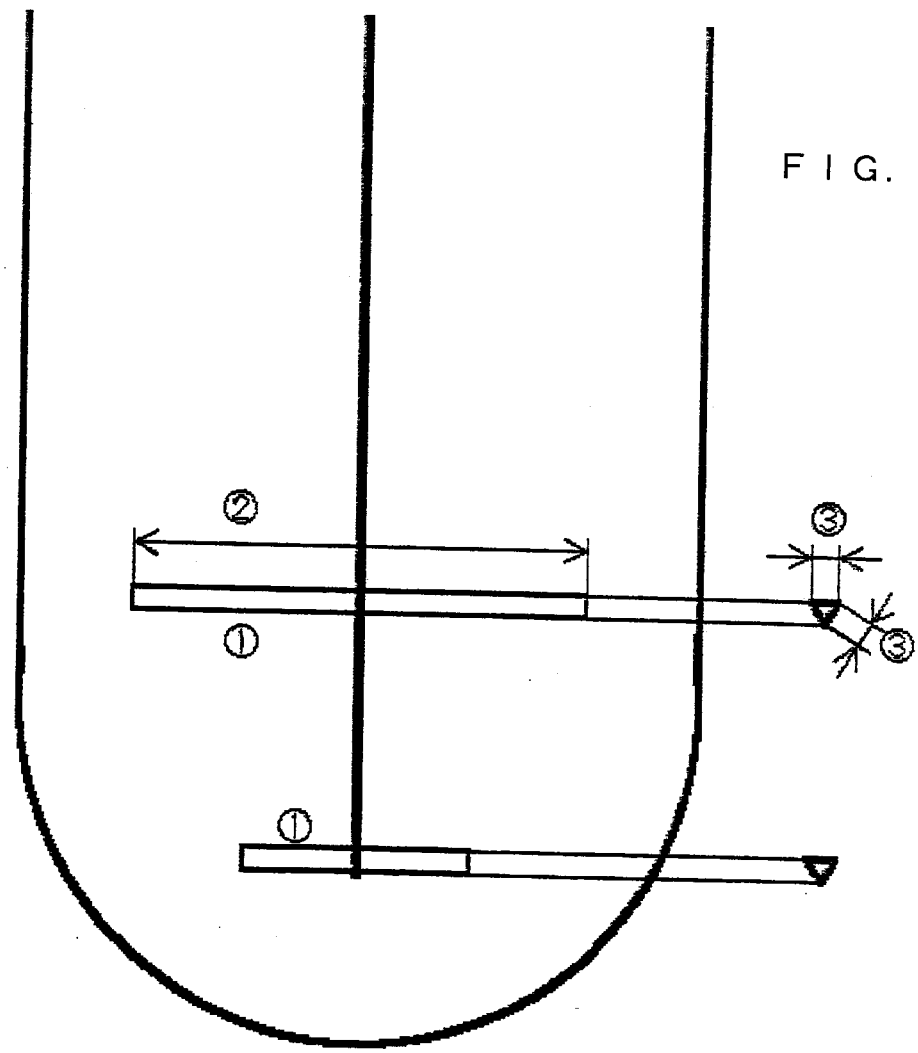
FIG. 2 is a diagram of the side cross section of a stirring vessel having a stirring blade of delta blade form in two stages.

Polyphenylene ether in the present invention is derived, by oxidative polymerization, from a compound represented by the following formula (1).

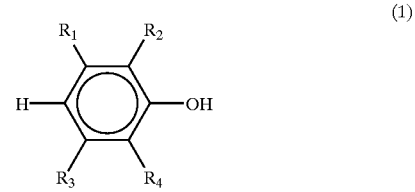

(wherein $R_1$, $R_2$, $R_3$ and $R_4$ represent independently substituents selected from the group of a hydrogen atom, an alkyl group, a substituted alkyl group, a halogen atom, an aryl group or a substituted aryl group.)

Specific examples of polyphenylene ether of the present invention are homopolymers such as poly(2,6-dimethyl-1,4-phenylene)ether,
poly(2-methyl-6-ethyl-1,4-phenylene)ether,
poly(2,6-diethyl-1,4-phenylene)ether,
poly(2-ethyl-6-n-propyl-1,4-phenylene)ether,
poly(2-methyl-6-n-propyl-1,4-phenylene)ether,
poly(2-ethyl-6-isopropyl-1,4-phenylene)ether,
poly(2-methyl-6-chloroethyl-1,4-phenylene)ether,
poly(2-methyl-6-hydroxyethyl-1,4-phenylene)ether; and
polyphenylene ether copolymer such as 2,6-dimethylphenol
copolymerized with 2,3,6-trimethylphenol and/or o-cresol, and the like.

Examples of the good solvent for polyphenylene ether are aromatic compounds such as benzene, toluene and xylene, and toluene is preferably used. The concentration of the polyphenylene ether solution may be within the range of the solubility of polyphenylene ether. To decrease the amount of the non-solvent used, it is desirable to supply the polyphenylene ether solution into the stirring vessel while maintaining temperature to the extent that polyphenylene ether does not precipitate, after heating and condensing the solution. The polyphenylene ether solution is supplied into the stirring vessel continuously.

Examples of the non-solvent for polyphenylene ether are alcohol such as methanol, ethanol, isopropanol and n-buthanol; ketones such as acetone and methyl ethyl ketone, and particularly preferable is methanol. The amount of the non-solvent used is desirable to be 0.5 to 2.0 times by weight based on the good solvent. It is desirable further to let water co-exist with a mixture of the good solvent and the non-solvent within a range that the mixture can maintain single liquid phase. The non-solvent and water are introduced into the stirring vessel continuously.

According to the present invention, the polyphenylene ether is precipitated in the stirring vessel with a reciprocating stirrer continuously. On the other hand, although polyphenylene ether can be also precipitated by using a rotary stirrer, there is a defect that fibrous precipitates coil around the stirring blade. In order to make the particle diameter of the polyphenylene ether particles precipitated larger, sufficient stirring for performing prompt mixing of the solution with the non-solvent is desirable. However, if stirring is made too violently, the particles precipitated will tend to be pulverized by a shearing action of stirring.

According to the present invention, the above-mentioned problems can be solved by dropping the polyphenylene ether solution outside the working range of the stirring blade. Here, "the working range of the stirring blade" means a working range when viewed the stirring vessel from above, and FIG. 1 shows the working range in a case where the angle of the reciprocating motion of the stirring blade is 90 degrees. When there are a plurality of stages of stirring blades in the up and down direction, it should be understood that the above-mentioned dropping is performed outside the working range of the stirring blade of the top stage.

There is no particular restriction on the form of the stirring blade used for the present invention, but it is preferable to use a blade of delta form as shown in the FIG. 2. When the delta blade is used, it is preferable to set up number of rotations and length of the stirring blade so that stirring power per liquid measure may be set to 0.7 to 5.0 PS/m$^3$. The above-mentioned stirring power is the total of the values calculated by the following formula for every stage of the stirring blades.

$$P = N_p \times \rho \times (N/60)^3 \times Di^5 / 75 / g_c$$

P: stirring power (PS)

$N_p$: number of power $\rho$: density of liquid (kg/m$^3$)

N: number of rotations (cycle/min.)

$D_i$: length of stirring blade (m)

$g_c$: gravity conversion coefficient=9.81 (kg·m)/(kg·s$^2$)

Moreover, number of power is calculated by the following equations.

$$N_p = A/(N_{Re})^{0.9} + (8.16 \times 10^{-3}) \times A \times (N_{Re})^{0.012}$$

$$A = 1.5 \times 10^3 \times (B/D_i)^{1.72} + 3.5 \times (B/D_i)^{0.15}$$

B: width of stirring blade (tip part, mm)

$$N_{Re} = Di^2 \times (N/60) \times \rho / \mu$$

$\mu$: liquid viscosity (kg/m·s)

Further, when the angle of the motion of the stirring blades is 90 degrees and a plurality of stages of the stirring blades are equipped, it is desirable that the ratio of (the length of stirring blades other than lowest stage (A)/the length of stirring blade of the lowest stage (B)) is 1.5 or more.

In order to precipitate the particles of polyphenylene ether containing fine power in a small amount, it is desirable to set the inner diameter of the stirring vessel so that the ratio of (the flat bottom assumption liquid height in the stirring vessel/the inner diameter of the stirring vessel) is 0.5 to 1.2, and the inner diameter of the stirring vessel is 1.2 to 2.0 times the maximum length of the stirring blade. Here, "the flat bottom assumption liquid height" (the liquid height in case of the assumption that the bottom is flat) is obtained by dividing liquid volume by the horizontal cross-section area of the stirring vessel.

Although there is no particular restriction in the method of discharging a polyphenylene ether slurry, it is desirable to carry out the discharge of the slurry continuously by overflow.

Further, the average residence time of polyphenylene ether in the stirring vessel is desirable to be 1 to 10 minutes. If the residence time is too short, polyphenylene ether will precipitate insufficiently. On the other hand, if the residence time is too long, pulverization of the precipitated polyphenylene ether particles will proceed due to stirring.

In the present invention, the polyphenylene ether can be precipitated by only the stirring vessel with the reciprocating stirrer. It is also possible, however, that the polyphenylene ether slurry which has been precipitated in the first stirring vessel with reciprocating stirrer be introduced into the second stirring vessel to further add a non-solvent thereto. The latter is more desirable because the particles can be aged.

When precipitation of polyphenylene ether is carried out by two stirring vessels, it is desirable that the ratio of the weight of non-solvent to the weight of good solvent in the first stirring vessel with the reciprocating stirrer may be 0.5 to 1.0 and the ratio of the weight of non-solvent to the weight of good solvent in the second stirring vessel may be 1.0 to 2.0. Further, stirring in the second stirring vessel may be performed to the minimum enough to maintain the slurry at a uniform state.

EXAMPLES

The following examples illustrate the present invention more specifically, but are in no way to be taken as limiting the invention.

Examples 1, 2 and Comparative Example 1

Figure 3:
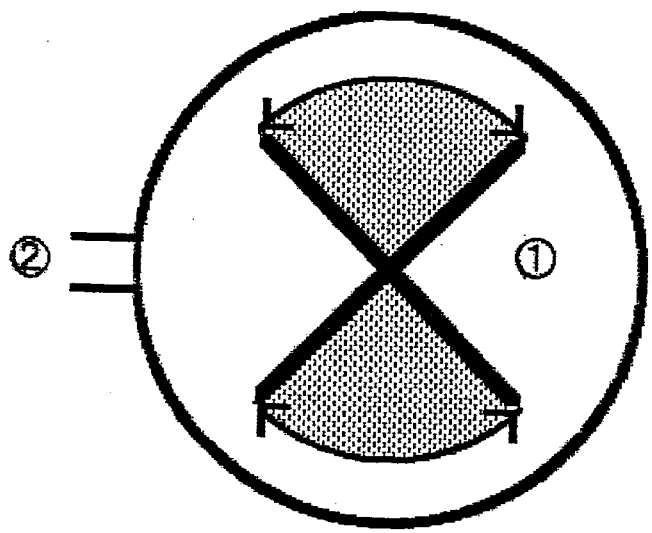
FIG. 3 is a diagram of a dropping position of a PPE solution of Example 1 in a schematic view of a stirring vessel with a stirring blade whose working range is 90 degrees, viewed from above.
Figure 3:
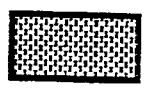
Figure 4:
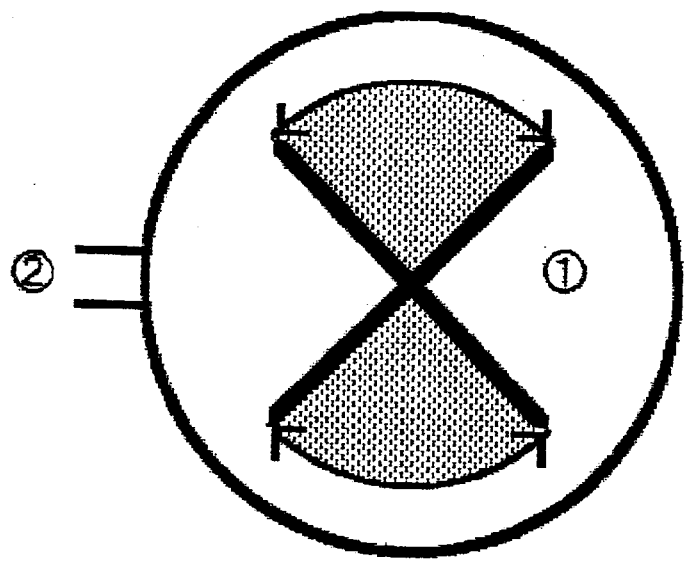
FIG. 4 is a diagram of a dropping position of a PPE solution of Example 2 in a schematic view of a stirring vessel with a stirring blade whose working range is 90 degrees, viewed from above.
Figure 4:
Figure 5:
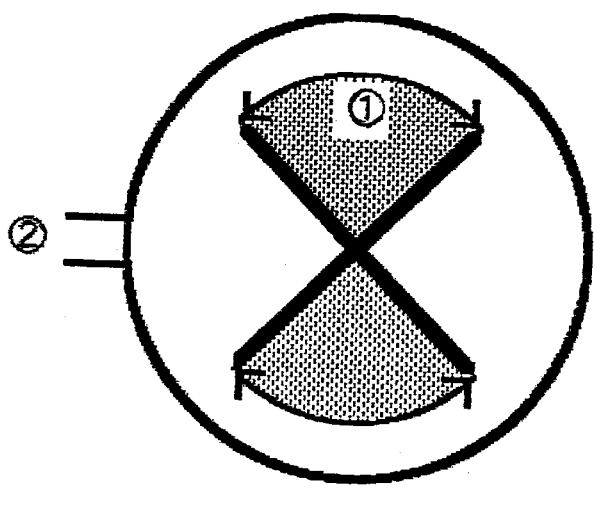
FIG. 5 is a diagram of a dropping position of a PPE solution of Comparative Example 1 in a schematic view of a stirring vessel with a stirring blade whose working range is 90 degrees, viewed from above.
Figure 5:

A toluene solution of 20 wt. % poly(2,6-dimethyl-1,4-phenylen)ether, methanol and water were continuously supplied into the first stirring vessel with a reciprocating stirrer (AJITER SV-01 mode having delta blades, produced by SHIMAZAKI MIXING EQUIPMENT CO., LTD.) to precipitate polyphenylene ether particles. The polyphenylene ether slurry and methanol which were overflowed from the first stirring vessel were continuously supplied into the second stirring vessel with a stirrer rotating only in the one direction, to age polyphenylene ether particles. Then, the slurry was collected from the bottom of the second stirring vessel, suction-filtered through the Kiriyama funnel which was laid a filter paper (No. 5B), and washed with methanol of a volume of 0.5 times the slurry to obtain a wet powder of polyphenylene ether. The obtained wet powder was extended on a laboratory dish, put into a box type dryer, and dried, while flowing the nitrogen of 5 Nm$^3$/h, at 135 to 140° C. for 2 hours or more to obtain a dry powder of polyphenylene ether. The obtained dry powder was measured for the average particle diameter and the rate of fine powder of smaller than 50 $\mu$m particle diameter. The conditions and measurement results in the first and second stirring vessel are shown in Table 1. Further, the dropping positions of each liquid in the first vessels are shown in FIGS. 3 to 5.

TABLE 1

|  | Example 1 | Example 2 | Comparative Example 1 |
|---|---|---|---|
| First Stirring Vessel | | | |
| Dropping Position of PPE | Outside of Working | Outside of Working | Inside of Working Range |
| Stirring Blade | Range (FIG. 4) | Range (FIG. 5) | (FIG. 6) |
| (Length of Blade: mm) | Single Stage (190) | Upper Stage (180) | Single Stage (190) |
|  |  | Lower Stage (90) |  |
| Height of Liquid (mm) | 180 | 180 | 180 |
| Inner Diameter of the Stirring Vessel (mm) | 260 | 260 | 260 |
| Residence Time (min.) | 7 | 8 | 7 |
| Stirring Power (PS/m$^3$) | 1.0 | 1.3 | 1.0 |
| Rate of Liquid | | | |
| ME/TL | 0.7 | 0.6 | 0.7 |
| water/ME | 0.08 | 0.07 | 0.08 |
| Second Stirring Vessel | | | |
| Rate of Liquid ME/TL | 1.5 | 1.5 | 1.5 |
| Precipitated PPE Particles Average Particle Diameter (μm) | 777 | 741 | 705 |
| Rate of Fine Powder (< 50 μm) | 1% | 2% | 14% |

PPE: polyphenylene ether
ME: methanol
TL: toluene
Height of Liquid: Flat Bottom Assumption Liquid Height According to the present invention, the polyphenylene ether particles having the small rate of the fine powder in the particles can be obtained, and the handling at the time of molding of the polyphenylene ether particles can be facilitated.

What is claimed is:

1. A method for precipitating polyphenylene ether, which comprises adding a non-solvent for polyphenylene ether to a solution of polyphenylene ether in a good solvent for polyphenylene ether to precipitate polyphenylene ether continuously in a stirring vessel with a reciprocating stirrer, wherein the polyphenylene ether solution is dropped outside the working range of a stirring blade.

2. The method of claim 1, wherein the good solvent for polyphenylene ether is at least one selected from the group consisting of benzene, toluene and xylene.

3. The method of claim 1, wherein the non-solvent for polyphenylene ether is at least one selected from the group consisting of methanol, ethanol, isopropanol, n-buthanol, acetone and methyl ethyl ketone.

4. The method of claim 1, wherein water co-exists in a range at which a mixture of the good solvent and the non-solvent maintains a single liquid phase.

5. The method of claim 1, wherein a ratio of (the weight of the non-solvent/the weight of the good solvent) in the stirring vessel is 0.5 to 2.0.

6. The method of claim 1, wherein water co-exists further in the stirring vessel, in the range at which the mixture of the good solvent and the non-solvent maintains a single liquid phase.

7. The method of claim 1, wherein the stirring blade is the blade of a delta form, and the stirring power per liquid measure is set to 0.7 to 5.0 PS/m$^3$.

8. The method of claim 1, wherein the angle of the motion of the stirring blade is 90 degrees and a plurality of stages of the stirring blades are equipped, the ratio of (the length of the stirring blades other than lowest stage (A)/the length of the stirring blade of the lowest stage (B)) is 1.5 or more.

9. The method of claim 1, wherein the ratio of (the flat bottom assumption liquid height in the stirring vessel/the inner diameter of the stirring vessel) is 0.5 to 1.2 and the inner diameter of the stirring vessel is 1.2 to 2.0 times to the maximum length of the stirring blade.

10. The method of claim 1, wherein slurry having the precipitated polyphenylene ether in the stirring vessel is discharged by overflow.

11. The method of claim 1, wherein the average residence time of polyphenylene ether in the stirring vessel is 1 to 10 minutes.

12. A method for precipitating polyphenylene ether, which comprises introducing the slurry formed in the first stirring vessel by the method of claim 1 to the second stirring vessel, and further adding the non-solvent for polyphenylene ether to the second stirring vessel.

13. The method of claim 11, wherein the ratio of (the weight of the non-solvent/the weight of the good solvent) is 0.5 to 1.0 in the first stirring vessel with the reciprocating stirrer, and the ratio of (the weight of the non-solvent/the weight of the good solvent) is 1.0 to 2.0 in the second stirring vessel.

* * * * *